United States Patent
Scanlon

(10) Patent No.: US 7,832,430 B2
(45) Date of Patent: Nov. 16, 2010

(54) LOSS REDUCTION APPARATUS

(75) Inventor: Timothy John Scanlon, Derby (GB)

(73) Assignee: Rolls-Royce PLC, London (GB)

( * ) Notice: Subject to any disclaimer, the term of this patent is extended or adjusted under 35 U.S.C. 154(b) by 770 days.

(21) Appl. No.: 11/790,642

(22) Filed: Apr. 26, 2007

(65) Prior Publication Data

US 2008/0035204 A1    Feb. 14, 2008

(30) Foreign Application Priority Data

May 25, 2006    (GB)    ............................ 0610357.6

(51) Int. Cl.
  *F15C 1/00*    (2006.01)
(52) U.S. Cl. .................. 137/835; 60/806; 137/813; 137/809
(58) Field of Classification Search ............... 137/455, 137/803, 809, 813–815, 818, 834, 835; 60/806
   See application file for complete search history.

(56) References Cited

U.S. PATENT DOCUMENTS

| 3,452,772 | A |   | 7/1969  | Zaloudek       |         |
|-----------|---|---|---------|----------------|---------|
| 3,986,527 | A | * | 10/1976 | Mon            | 137/819 |
| 5,063,733 | A | * | 11/1991 | Jackson et al. | 60/806  |
| 5,312,205 | A |   | 5/1994  | Wicks, III     |         |

FOREIGN PATENT DOCUMENTS

| EP | 0 417 940 A1   | 3/1991  |
| EP | 0 936 417 A2   | 8/1999  |
| EP | 1 391 596 A1   | 2/2004  |
| GB | A 2 218 826    | 11/1989 |
| GB | 2 240 812 A    | 8/1991  |
| GB | 2 391 959 A    | 2/2004  |
| JP | A 2-140574     | 5/1990  |
| JP | A 2003-20959   | 1/2003  |
| WO | WO 00/17479    | 3/2000  |

OTHER PUBLICATIONS

British Search Report for Application No. EP 07 25 1752, issued Nov. 27, 2009.

* cited by examiner

*Primary Examiner*—Craig M Schneider
(74) *Attorney, Agent, or Firm*—Oliff & Berridge, PLC

(57) ABSTRACT

Loss reduction apparatus for a fluid transfer system includes a fluid device. The fluid device defines a first fluid path along which a greater part of a fluid flows in a first condition, and a second fluid path along which a greater part of the fluid flows in a second condition. The apparatus is arranged so that when a leak occurs at a location in the system, the leak causes a relative reduction in fluid pressure at the location, which moves the device from the first condition to the second condition.

20 Claims, 5 Drawing Sheets

LOSS REDUCTION APPARATUS

The present invention concerns loss reduction apparatus, particularly but not exclusively loss reduction apparatus for reducing a loss of fluid through a leak in a fluid transfer system.

Fluid transfer systems typically include pipes which define passages along which fluid is communicated, and such systems carry a risk that a pipe can be fractured resulting in a loss of fluid through a leak.

According to a first aspect of the present invention, there is provided loss reduction apparatus for a fluid transfer system, the loss reduction apparatus including a fluid device which defines a first fluid path along which a greater part of a fluid flows in a first condition and a second fluid path along which a greater part of the fluid flows in a second condition, the apparatus being arranged so that when a leak occurs at a location in the system, the leak causes a relative reduction in fluid pressure at the location which moves the device from the first condition to the second condition.

Preferably, the apparatus is arranged so that in the second condition the second fluid path permits either no flow or only a relatively reduced flow of fluid to the location.

The fluid device may include a first device, which may be a bistable fluidic device. Preferably, the first device includes a first port and a second port. Preferably, the first fluid path includes a path extending from the first port to the second port. Preferably, the first device includes a third port, and the second fluid path includes a path extending from the first port to the third port.

Preferably, the first device includes control means, which may operate to divert the flow from the first path to the second path when the leak occurs.

The control means may include control passages, along which control fluid flows may be communicated, which operate to divert the fluid flow. The control means may include a first control passage, which may communicate with a location on the first fluid path downstream of the first device and towards the location of the leak. The control means may include a second control passage, which may communicate with a location on the first fluid path upstream of the first device.

Possibly, the reduction in pressure at the leak location changes the fluid flows along the control passages to divert the fluid flow.

Preferably, the location of the leak is downstream from the second port on the first fluid path.

In one example, the apparatus may include a bypass passage, and the second fluid path may include a path along the bypass passage which bypasses the location of the leak.

In another example, the fluid device may include a second fluid device, which may be a vortex device, and may define a first vortex chamber.

Preferably, the second device includes a fourth port, which may permit flow into the first vortex chamber. Preferably, the fourth port is a radial port. The first fluid path may include a path from the second port to the fourth port.

Preferably, the second device includes a fifth port which may permit flow into the first vortex chamber. Preferably, the fifth port is a tangential port. The second fluid path may include a path from the third port to the fifth port.

Preferably, the second device includes a sixth port, which may permit flow out of the vortex chamber. Preferably, the sixth port is an axial port.

Preferably, the first fluid path includes a path from the fourth port to the sixth port. Preferably, the second fluid path includes a path from the fifth port to the sixth port, which may be a swirling vortex path, so that the flow from the fifth port to the sixth port in the second condition is less than the flow from the fourth port to the sixth port in the first condition.

Preferably, the location of the leak is downstream from the sixth port.

Alternatively or additionally, the fluid device may include a third device, which may be a vortex device, and may define a second vortex chamber.

Preferably, the third device includes a seventh port, which may be an axial port.

Preferably, the third device includes an eighth port, which may be a tangential port.

The first fluid path may include a path from the sixth port to the seventh port, and may include a path from the seventh port to the eighth port via the second vortex chamber.

Preferably, the leak location is between the sixth and seventh ports.

The second fluid path may include a path from the eighth port to the seventh port via the second vortex chamber, which may be a swirling vortex path, so that the flow from the eighth port to the seventh port in the second condition is less than the flow from the seventh port to the eighth port in the first condition.

Preferably, the fluid transfer system forms part of an engine cooling system, and may form part of a gas turbine engine cooling system.

According to a second aspect of the present invention, there is provided a method of reducing a loss of fluid through a leak in a fluid transfer system, the method comprising the step of providing loss reduction apparatus in the fluid transfer system, the loss reduction apparatus including a fluid device which defines a first fluid path along which a greater part of a fluid flows in a first condition and a second fluid path along which a greater part of the fluid flows in a second condition, the apparatus being arranged so that when a leak occurs at a location in the system, the leak causes a relative reduction in fluid pressure at the location which moves the device from the first condition to the second condition.

Preferably, the loss reduction apparatus includes any of the features described in the preceding paragraphs.

According to a third aspect of the present invention, there is provided a fluid transfer system including loss reduction apparatus as described in the said preceding paragraphs.

According to a fourth aspect of the present invention, there is provided a gas turbine engine including loss reduction apparatus as described in the said preceding paragraphs.

Embodiments of the present invention will now be described, by way of example only, and with reference to the accompanying drawings, in which:—

Figure 1:
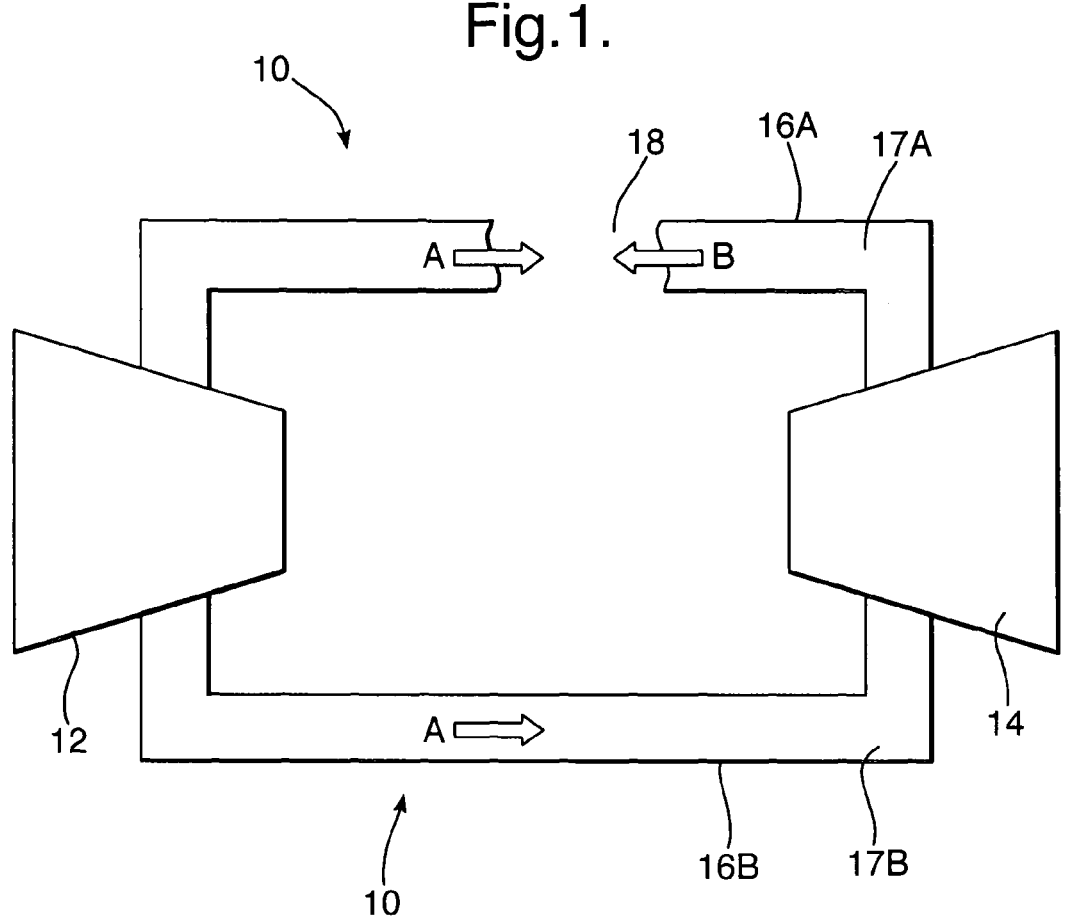
FIG. 1 is a schematic diagram of a known gas turbine engine cooling system.

FIG. 1 shows a fluid transfer system in the form of a cooling system 10 for a gas turbine engine, the gas turbine engine comprising a compressor 12 and a turbine 14. The cooling system 10 includes cooling pipes 16A, 16B which define passages 17A, 17B respectively.

In FIG. 1, the lower pipe 16B is shown in a first, normal operating condition, in which fluid is being transferred from the compressor 12 to the turbine 14 as shown by arrow A. The upper pipe 16A is shown in a second, broken condition, the pipe 16A having a leak at a location 18. Fluid from both the compressor 12 as shown by arrow A and from the turbine 14 as shown by arrow B is lost from the leak at the location 18. The loss of cooling fluid is detrimental to the efficiency of the engine, and can cause overheating of components in the turbine 14.

Figure 2:
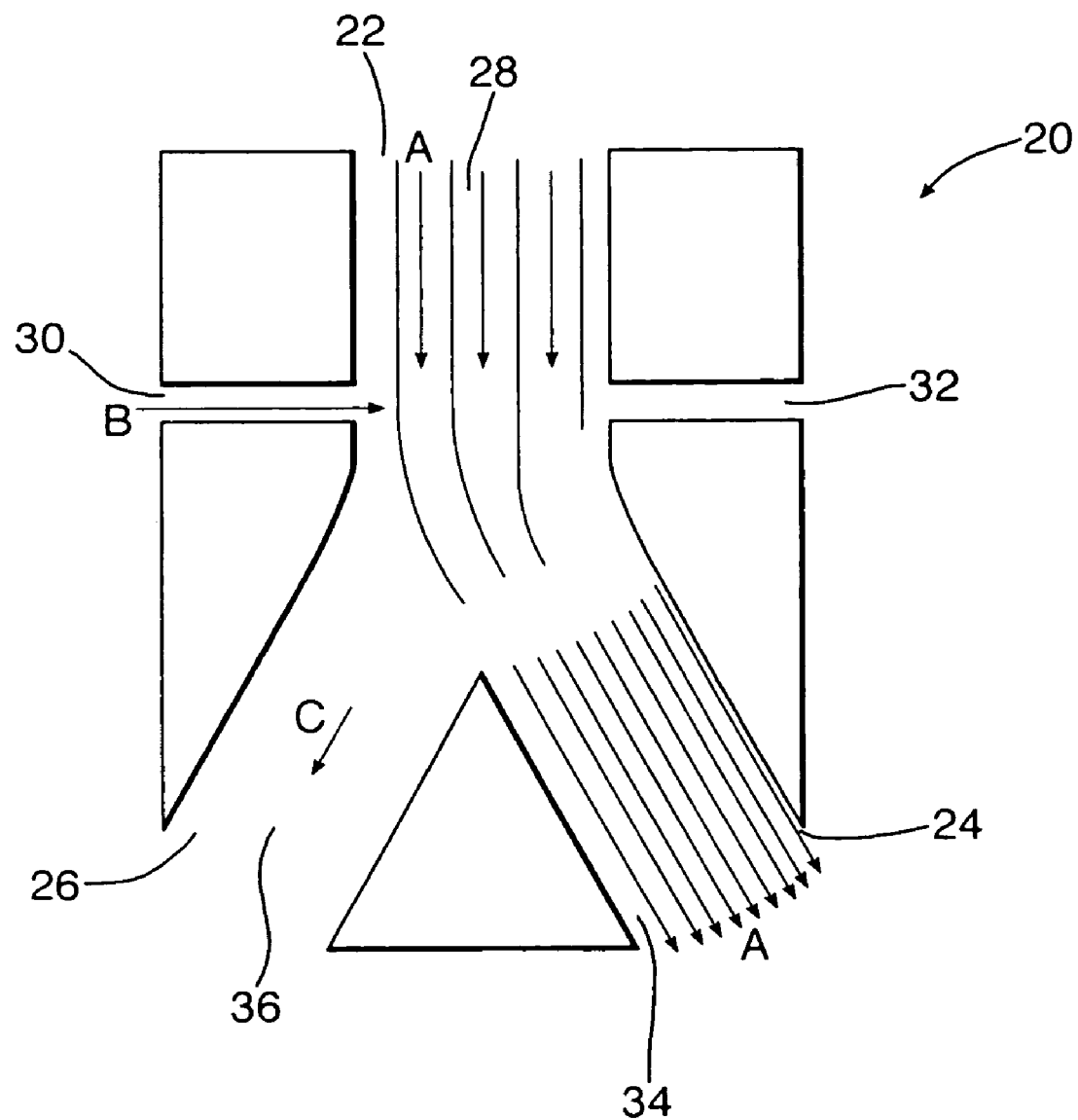
FIG. 2 is a schematic diagram of a first fluid device.

FIG. 2 shows in schematic form a first device 20. This type of device is known as a bistable or flip-flop fluidic device. The first device 20 defines a first port 22 which is an inlet port, and second and third ports 24, 26 which are outlet ports. The first device 20 defines an inlet passage 28 which extends from the first port 22 and bifurcates to form first and second outlet passages 34, 36 which extend to the second and third ports 24, 26 respectively.

The first device 22 defines first and second control passages 30, 32, which extend transversely from opposite directions to join the inlet passage 28 in flow sequence just before the bifurcation.

As shown in FIG. 2, the first device 20 is in a first operating condition, in which a fluid flows along a first fluid path as indicated by arrows A through the first port 22, along the inlet passage 28 and then along one of the outlet passages 34 and through the second port 24. Fluid flows along the first control passage 30 as indicated by arrow B, the amount of fluid flow along the control passage 30 being small in relation to the amount of fluid flow along the inlet passage 28. However, this relatively small control fluid flow causes substantially all of the flow along the inlet passage 28 to divert along the first outlet passage 34, by virtue of a fluidic effect known as the Coanda effect. In this condition, there is substantially no or relatively little flow along the second control passage 32.

To switch the fluid flow from the first outlet passage 34 to the second outlet passage 36, the control fluid flow along the first control passage 30 is reduced and the control fluid flow along the second control passage 32 is increased, so that in a second condition, the fluid flows along a second fluid path through the first port 22, along the inlet passage 28 and is diverted along the second outlet passage 36 as indicated by arrow C and through the third port 26. Thus the variation of the control fluid flows along the control passages 30, 32 switches the relatively large flow between the first fluid path to the first outlet passage 34 and the second fluid path to the second outlet passage 36.

Figure 3A:
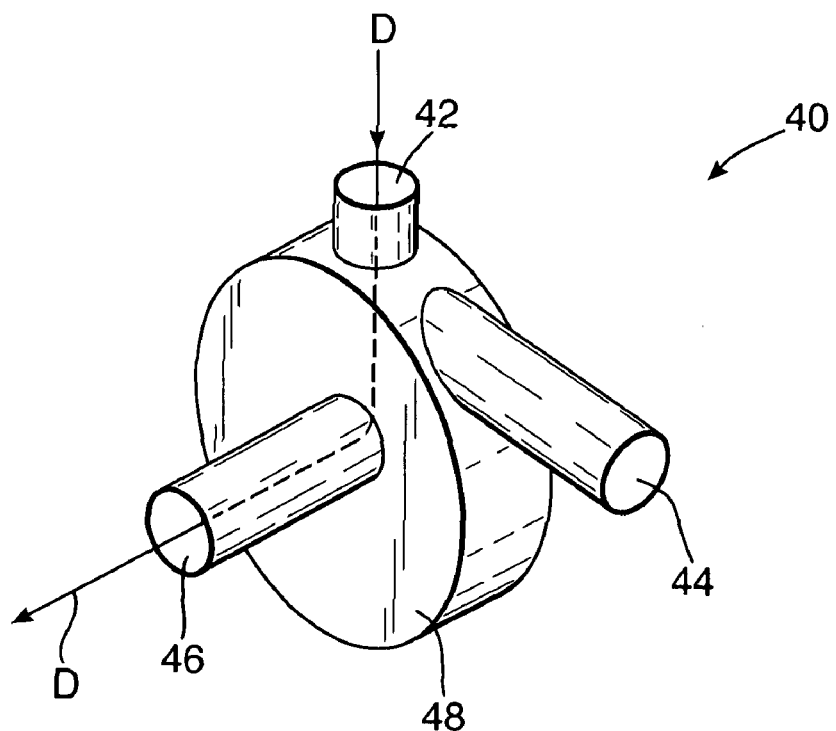
FIGS. 3A and 3B are schematic diagrams of a second fluid device in first and second operating conditions respectively.
Figure 3B:
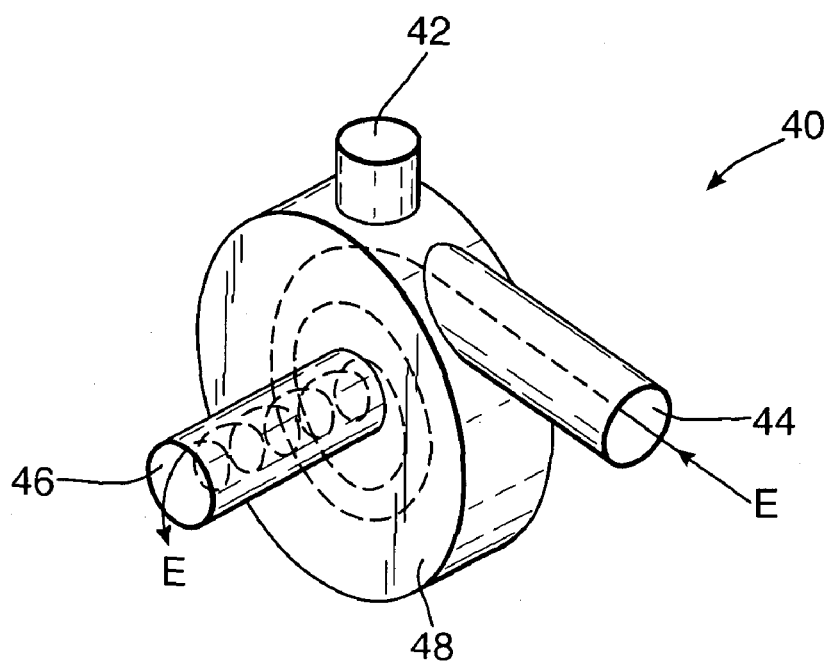

FIGS. 3A and 3B show a second device 40, known as a three port vortex fluidic device. The second device 40 defines a first vortex chamber 48, a fourth port 42 in the form of a radial port, a fifth port 44 in the form of a tangential port and a sixth port 46 in the form of an axial port.

FIG. 3A shows the second device 40 in a first condition. In this condition, fluid flows along a first fluid path as indicated by arrow D, entering the first vortex chamber 48 via the fourth port 42 and exiting the first vortex chamber 48 via the sixth port 46. Since the flow enters the first vortex chamber 48 radially and exits axially, there is a relatively low pressure drop over the second device 40 and therefore flow through the second device 40 is relatively unimpeded along the first fluid path in the first condition.

FIG. 3B shows the second device 40 in a second condition. There is now no flow through the fourth port 42, but instead fluid flows along a second fluid path, entering the first vortex chamber 48 via the fifth port 44 and exiting via the sixth axial port 46 as indicated by arrows E. The fifth port 44 causes the flow within the first vortex chamber 48 to follow a swirling vortex path as indicated by the dotted lines in FIG. 3B, so that the pressure drop between the fifth port 44 and sixth port 46 is relatively high so that the flow along the second path is impeded and therefore reduced.

Figure 4A:
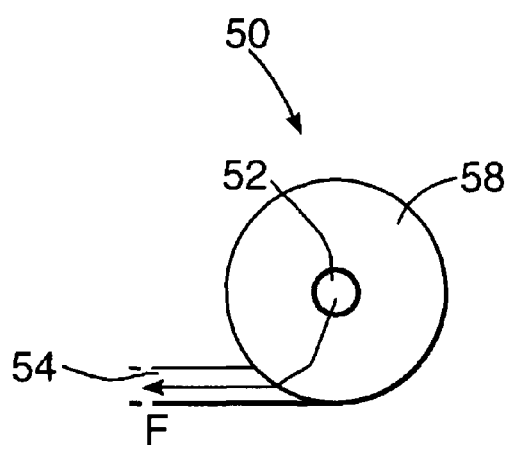
FIGS. 4A to 4D are schematic diagrams in plan and from a side of a third fluid device in first and second operating conditions respectively.
Figure 4B:
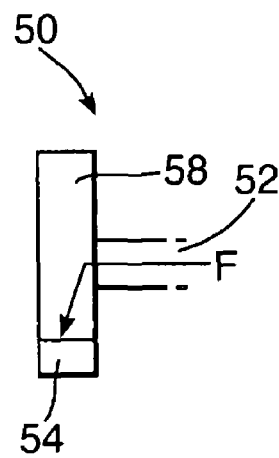

FIGS. 4A and C show a third device 50 in plan and FIGS. 4B and D show the third device 50 from the side. The third device 50, known as a vortex fluidic device, defines a second vortex chamber 58, a seventh port 52 in the form of an axial port and an eighth port 54 in the form of a tangential port.

In a first condition, as shown in FIGS. 4A and B, fluid flows along a first fluid path as shown by arrows F, entering the second vortex chamber 58 via the seventh axial port 52 and exiting the second vortex chamber 58 via the eighth tangential port 54. Since the flow enters the second vortex chamber 58 axially, there is a relatively low pressure drop over the third device 50 and therefore flow through the third device 40 is relatively unimpeded along the first fluid path in the first condition.

Figure 4C:
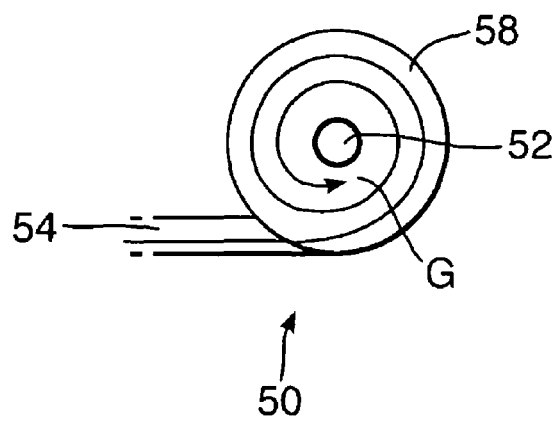
Figure 4D:
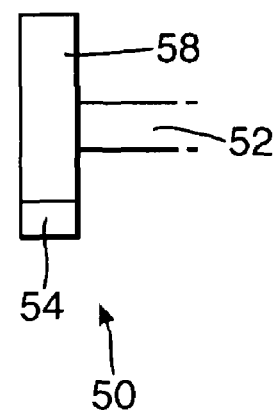

FIGS. 4C and D show the third device 50 in a second condition, in which the direction of flow is reversed, so that the fluid flows along a second fluid path as shown by arrow G, entering the second vortex chamber 58 via the eighth tangential port 54 and exiting via the seventh axial port 52. In this condition, the flow forms a swirling vortex within the second vortex chamber 58 so that the pressure drop between the eighth port 54 and the seventh port 52 is relatively high and the flow along the second path is impeded and therefore reduced.

Figure 5:
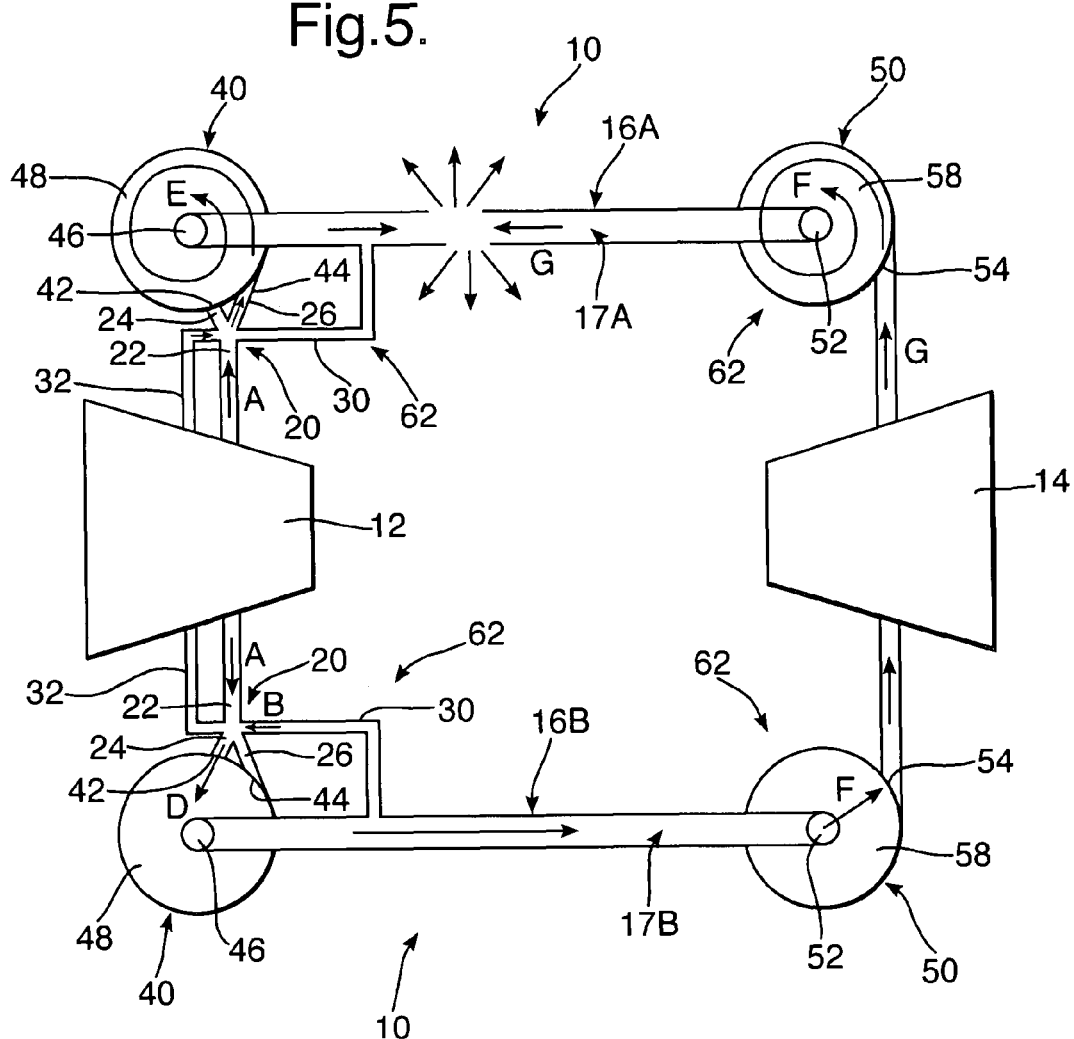
FIG. 5 is a schematic diagram of a fluid transfer system according to the invention.

FIG. 5 shows a fluid transfer system 10 which could be part of a gas turbine engine. The fluid transfer system 10 includes fluid transfer pipes 16 which define passages 17 for transferring cooling fluid such as air between a compressor 12 and a turbine 14.

The fluid transfer system 10 includes loss reduction apparatus 62, the loss reduction apparatus 62 being positioned so that a fluid being communicated along each passage 17 does so via the loss reduction apparatus 62.

The loss reduction apparatus 62 includes, in flow sequence from the compressor 12, a first device 20, a second device 40 and a third device 50. Each of these devices are substantially the same as those described previously in relation to FIGS. 2, 3 and 4, and operate in the same manner in the first and second conditions, and therefore the same terms and reference numerals will be used as previously.

The first device 20 could be positioned in the vicinity of or adjacent to the compressor 12, and the second device 40 could be positioned in the vicinity of or adjacent to the first device 20. The third device 50 could be positioned in the vicinity of or adjacent to the turbine 14.

The lower part of FIG. 5 shows a fluid transfer system 10 in a first condition, in which there are substantially no leaks within the system and the system is operating normally. Each of the first, second and third devices is in the first condition as previously described.

In use, a greater part, and optimally substantially all of a fluid flows along a first fluid path as shown by arrows A, D and F. The first fluid path includes a path from the compressor 12 through the first port 22 of the first device 20 as shown by arrow A. The first control passage 30 communicates with a location in the passage 17 on the first fluid path downstream of the second device 40 and towards the location 18 of the leak, and the second control passage 32 communicates a location on the first fluid path upstream of the first device, which in this example is within the compressor 12. In the first condition, control flows along the control passages 30,32 are arranged so that the fluid flows along the first fluid path which includes a path from the first port 22 through the second port 24. The first fluid path includes a path from the second port 24 to the fourth port 42 of the second device 40.

The first fluid path includes a path in the second device 40 from the fourth port 42 to the sixth port 46 as shown by arrow D, a path from the sixth port 46 to the seventh port 52 of the third device 50, a path from the seventh port 52 to the eighth port 54 as shown by arrow F, and subsequently a path from the eighth port 54 to the turbine 14.

In the first condition, the respective paths through the second and third devices 40, 50 are arranged so that the pressure drops of the fluid flows through these devices are relatively small, and thus the flow from the compressor 12 to the turbine 14 is therefore relatively unimpeded.

The upper part of FIG. 5 shows a fluid transfer system 10 in the second condition, in which a leak has occurred at a location 18 between the second device 40 and the third device 50. Since the second device 40 is located adjacent to or in the vicinity of the compressor 12, and the third device 50 is located adjacent or in the vicinity of the turbine 14, most of the length of the pipe 16 is located between the second and third devices 40, 50 and therefore the likeliest location 18 of the leak is in the length of pipe between the second and third devices 40, 50. As noted previously in relation to FIG. 1, when such a leak occurs, fluid flows towards the leak from both the compressor 12 and the turbine 14.

In the second condition, a greater part, and optimally substantially all of a fluid flows along a second fluid path which includes a path from the compressor 12 to the first port 22 of the first device 20. However, in the second condition, the flow through the control passages 30, 32 has changed. The leak 18 causes a reduction in pressure in the passage 17A downstream of the second device 40, so that the relative control flows through the control passages 30, 32 are changed, diverting the fluid to flow along the second path which includes a path through the first device 20 to the third port 26. The second fluid path includes a path from the third port 26 to the fifth port 44 of the second device 40.

The second fluid path includes a path from the fifth port 44 to the sixth port 46 of the second device 40. The fifth port 44 is a tangential port which causes the fluid to form a swirling vortex within the first vortex chamber 48 which substantially impedes flow therethrough, so that onward flow along the second fluid path from the sixth port 48 towards the location 18 of the leak is relatively low. Thus the arrangement of the first and second devices 20, 30 operates to reduce fluid flow from the compressor 12 to the location of the leak 18.

In the second condition, the second fluid path includes a path from the turbine 14 as shown by arrow G to the eighth port 54 of the third device 50, a path from the eighth port 54 to the seventh port 52, and a path thence to the location of the leak 18. However, the eighth port 54 is a tangential port which causes the fluid to form a swirling vortex within the second vortex chamber 58, which substantially impedes flow therethrough, so that the flow along the second fluid path is reduced relative to flow along the first fluid path in the first condition, and thus the loss of fluid through the leak 18 from the turbine 14 is reduced.

The loss reduction apparatus 62 operates automatically on the occurrence of the leak to reduce the fluid flow from both the compressor 12 and turbine 14 to the location 18 of the leak. No other mechanism is involved, nor is any human input, monitoring or operation required. The apparatus 62 does not use any mechanical or moving parts, and is therefore inherently more reliable than a mechanical arrangement and requires less maintenance.

In one example, it was found that the flow to the leak location in the second condition was 20% of the flow in the first condition. Ideally, the flow to the leak location is reduced to nil in the second condition.

Various other modifications may, be made without departing from the scope of the invention. The loss reduction apparatus could include any suitable combination of the first, second or third devices.

Figure 6:
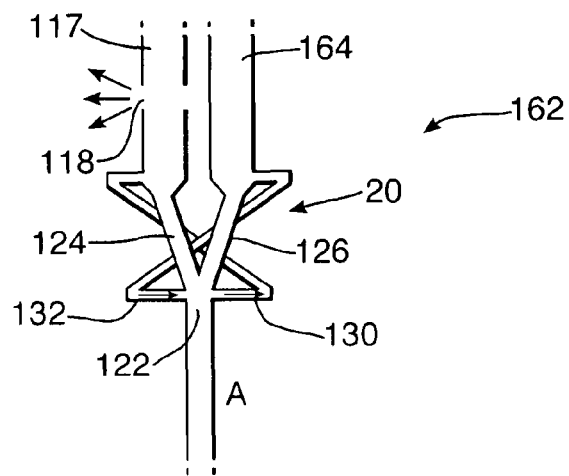
FIG. 6 is a schematic diagram of another fluid transfer system according to the invention.

FIG. 6 shows another embodiment of the invention, in which loss reduction apparatus 162 includes a first device 20, which is in communication with a pair of first and second passages 117, 164. The first device 20 is substantially the same as the first device 20 previously described. In a first condition, a fluid flows along a first fluid path including a path from, for example, the compressor 12 through the first port 122 of the first device 20.

Control passages 130, 132 communicate respectively with the first and second passages 117, 164, and are arranged so that in a normal, first condition, the first fluid path includes a path through the second port 124 to the first passage 117. In this first condition, the second passage 164 is essentially redundant.

In the second condition, a leak 118 has occurred at a location downstream of the first device 20 in the first passage 117. The leak causes a reduction in fluid pressure at the location 118 of the leak, so that the relative control flows through the control passages 130, 132 are changed, diverting the fluid to flow along the second path which includes a path through the third port 126 and along the second passage 164.

Thus, the flow of fluid to the location of the leak 118 is reduced, reducing the loss of fluid through the leak, the flow being diverted through the second passage 164. The second passage 164 could be in communication with, for example, the turbine 14, or could loop back to the compressor 12. Thus, the second passage acts as a bypass passage, bypassing the leak.

The loss reduction apparatus of the invention could be used to reduce the loss of any suitable fluid through a leak in any fluid transfer system.

There is thus provided loss reduction apparatus for reducing the loss of fluid through a leak in a fluid transfer system. The apparatus operates automatically to reduce fluid flow to the location of a leak, without requiring human intervention. The apparatus involves no moving parts and thus is inherently more reliable than apparatus utilising mechanical moving parts. The apparatus permits the reduction of loss of flow from both upstream and downstream sides of the leak.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. Loss reduction apparatus for a fluid transfer system, characterised in that the loss reduction apparatus comprises:
    a fluid device which defines:
    a first fluid path along which a greater part of a fluid flows in a first condition, and
    a second fluid path along which a greater part of the fluid flows in a second condition, the apparatus being arranged so that when a leak occurs at a location in the system, the leak causes a relative reduction in fluid pressure at the location which moves the device from the first condition to the second condition, the fluid device including a first device, which is a bistable fluidic device, the first device having a control means that operates to divert the flow from the first path to the second path when the leak occurs, the control means including control passages, along which control fluid flows are communicated which operate to divert the fluid flow, the reduction in pressure at the leak location changes the fluid flows along the control passages to divert the fluid flow; and a second device, which is a vortex device.

2. Apparatus according to claim 1, in which the apparatus is arranged so that in the second condition the second fluid path permits either no flow or only a relatively reduced flow of fluid to the location.

3. Apparatus according to claim 1, in which the control means include a first control passage, which communicates with a location on the first fluid path downstream of the first device and towards the location of the leak, and a second control passage, which communicates with a location on the first fluid path upstream of the first device.

4. Apparatus according to claim 1, in which the apparatus includes a bypass passage, and the second fluid path includes a path along the bypass passage which bypasses the location of the leak.

5. A fluid transfer system including loss reduction apparatus as defined in claim 1.

6. A gas turbine engine including loss reduction apparatus as defined in claim 1.

7. Apparatus according to preceding claim 1, in which the fluid transfer system forms part of an engine cooling system.

8. Apparatus according to claim 7, in which the fluid transfer system forms part of a gas turbine engine cooling system.

9. Apparatus according to claim 1, in which the first device includes a first port, a second port and a third port, the first fluid path including a path extending from the first port to the second port and the second fluid path including a path extending from the first port to the third port.

10. Apparatus according to claim 9, where the leak location is provided downstream from the second port on the first fluid path.

11. Apparatus according to claim 9, in which the second device includes a fourth port, which is a radial port and permits flow into the first vortex chamber, a fifth port, which is a tangential port and permits flow into the first vortex chamber and a sixth port, which is an axial port and permits flow out of the vortex chamber, and in which the first fluid path includes a path from the second port to the fourth port and the second fluid path includes a path from the third port to the fifth port.

12. Apparatus according to claim 1, in which the fluid device includes a third device, which is a vortex device, and defines a second vortex chamber.

13. Apparatus according to claim 12, in which the third device includes a seventh port, which is an axial port, and an eighth port, which is a tangential port.

14. Apparatus according to claim 13, in which the first fluid path includes a path from the seventh port to the eighth port via the second vortex chamber, and the second fluid path includes a path from the eighth port to the seventh port via the second vortex chamber, which is a swirling vortex path, so that the flow from the eighth port to the seventh port in the second condition is less than the flow from the seventh port to the eighth port in the first condition.

15. Apparatus according to claim 1, wherein the vortex device defines a first vortex chamber.

16. Apparatus according to claim 15, in which the second device includes a fourth port, which is a radial port and permits flow into the first vortex chamber, a fifth port, which is a tangential port and permits flow into the first vortex chamber and a sixth port, which is an axial port and permits flow out of the vortex chamber.

17. Apparatus according to claim 16, in which the first fluid path includes a path from the fourth port to the sixth port and the second fluid path includes a path from the fifth port to the sixth port, which is a swirling vortex path, so that the flow from the fifth port to the sixth port in the second condition is less than the flow from the fourth port to the sixth port in the first condition.

18. Apparatus according to claim 16, in which the fluid device includes a third device having a seventh port, which is an axial port, and an eighth port, which is a tangential port, and in which the first fluid path includes a path from the sixth port to the seventh port.

19. Apparatus according to claim 18, where the leak location is provided between the sixth and seventh ports.

20. A method of reducing a loss of fluid through a leak in a fluid transfer system, characterised in that the method comprises the steps of:

providing loss reduction apparatus in the fluid transfer system, the loss reduction apparatus including:
a fluid device which defines a first fluid path along which a greater part of a fluid flows in a first condition, and a second fluid path along which a greater part of the fluid flows in a second condition, arranging the apparatus so that when a leak occurs at a location in the system, the leak causes a relative reduction in fluid pressure at the location which moves the device from the first condition to the second condition;

using a first device, which is a bistable fluidic device, the first device having a control means;

diverting the flow from the first path to the second path when the leak occurs with the control means that includes control passages;

communicating control fluid flows along the control passages to divert the fluid flow;

reducing pressure at the leak location to change the fluid flow along the control passages; and using a second device, which is a vortex device.

* * * * *